United States Patent Office 3,563,686
Patented Feb. 16, 1971

3,563,686
DYEING PREPARATIONS FOR THE MANUFACTURE OF WATER-INSOLUBLE AZO DYESTUFFS ON TEXTILE MATERIAL OF AROMATIC POLYESTERS OF TRIACETYL CELLULOSE
Helmut Arm and Helmut Beutler, Langen, Hasso Hertel Offenbach am Main, and Rudolf Lowenfeld, Buchschlag, Germany, assignors to Farbwerke Hoechst Aktiengesellschaft vormals Meister Lucius & Bruning, Frankfurt am Main, Germany, a corporation of Germany
No Drawing. Filed May 10, 1968, Ser. No. 728,345
Claims priority, application Germany, May 13, 1967,
F 52,405
Int. Cl. D06p 1/18
U.S. Cl. 8—44                                     6 Claims

ABSTRACT OF THE DISCLOSURE

Dyeing preparations for the manufacture of water-insoluble azo dyestuffs on textile material of aromatic polyesters or triacetyl cellulose consisting of (a) an arylamide of 2,3-hydroxynaphtoic acid, (b) an aminobenzene which further contains substituents other than sulfonic acid or carboxylic acid groups, (c) a water-soluble condensation product of an aromatic hydroxy compound and an aromatic ω-methane-sulfonic acid, and (d) water.

---

The present invention relates to dyeing preparations for the manufacture of water-insoluble azo dyestuffs on textile material made of or containing an aromatic polyester or triacetyl cellulose which comprise (a) an arylamide of 2,3-hydroxynaphtoic acid, (b) an aminobenzene of the general Formula I

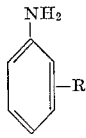

in which R represents a nitro, alkylsulfonyl, arylsulfonyl, alkylsulfonylamino or arylsulfonylamino group, or a sulfonic acid amide or carboxylic acid amide group which amides may be substituted, or an acylamino group, and in which the benzene nucleus may further contain halogen atoms, preferably chlorine or bromine, or alkyl or alkoxy groups, (c) a water-soluble condensation product of an aromatic hydroxy compound and an aromatic ω-methane-sulfonic acid and (d) water.

The dyeing preparations of the present invention are doughs or pastes consisting of about 10 to 30% by weight of an arylamide of 2,3-hydroxynaphthoic acid and about 10 to 30% of an aminobenzene of Formula I in about equimolar quantities, as well as of about 6 to 20% by weight of a water-soluble condensation product of an aromatic hydroxy compound and an aromatic ω-methane-sulfonic acid, and water; they contain the arylamide of 2,3-hydroxynaphthoic acid and the aminobenzene in finely dispersed form (particle size: smaller than 0.002 mm.).

In order to avoid freezing at temperatures below 0° C., the dyestuff preparations may furthermore contain a lower aliphatic polyalcohol, such as ethylene glycol or glycerol. To prevent the preparations from becoming moldy, small amounts of a fungicide, for example sodium pentachlorophenolate may be added.

By addition of water-insoluble phosphoric acid esters, which may be diluted with water-soluble organic solvents, a disturbing foam formation can be prevented during the preparation. Such compounds or mixtures are known from German Pat. No. 724,755. Especially effective for this purpose is a mixture consisting of about 60 parts of triisobutyl phosphate and about 40 parts of isobutyl alcohol.

The new dyeing preparations have very good stability when stored. By simply storing them into water, which may contain dyeing auxiliaries, dispersions are obtained ready for use which contain the dyestuff components in a very finely dispersed form. These dispersions are very stable so that the dyestuff components may be added to the dyebath in a single portion, even when used at a low ratio of goods-to-liquor, and the feeding which is required when using pulverulent dyeing preparations is not necessary. In consequence of being in the form of a dough or paste, the new dyeing preparations can be handled far better than the known dyeing preparations.

The dyeing preparations of the present invention contain an arylamide of 2,3-hydroxynaphthoic acid which is free from sulfonic acid or carboxylic acid groups and which is used in ice color technique, for example, 1-(2',3'-hydroxynaphthoylamino)-2-methylbenzene,
2,3-hydroxynaphthoylaminobenzene,
1-(2',3'-hydroxynaphthoylamino)-2-ethoxybenzene,
1-(2',3'-hydroxynaphthoylamino)-4-methoxybenzene,
1-(2',3'-hydroxynaphthoylamino)-4-methylbenzene,
1-(2',3'-hydroxynaphthoylamino)-2-methoxybenzene,
1-(2',3'-hydroxynaphthoylamino)-2,5-dimethoxybenzene,
1-(2',3'-hydroxynaphthoylamino)-2-methyl-4-
  methoxybenzene,
1-(2',3'-hydroxynaphthoylamino)-2-methoxy-5-
  chlorobenzene or
1-(2',3'-hydroxynaphthoylamino)-2-methyl-4-
  chlorobenzene, as well as an aminobenzene of Formula I which is free from sulfonic acid or carboxylic acid groups.

Moreover, said dyeing preparations contain a water-soluble condensation product of an aromatic hydroxy compound and an aromatic ω-methane-sulfonic acid, for example a condensation product of a 4,4'-dihydroxy-diphenylmethane and a 1-ω-sulfomethyl-2-hydroxynaphthalene-sulfonic acid obtainable according to the process of German Pat. No. 426,424, or preferably a condensation product which is obtained by reacting (1) formaldehyde with (2) a cresol, xylenol or resorcinol-monoalkyl ether or the mixtures thereof and (3) an alkali metal sulfite, and further condensed with (4) a sulfomethyl-hydroxynaphthalene-sulfonic acid, for example according to the process described in Fiat Final Report No. 1013, as well as water.

The present dyeing preparations are advantageously produced by grinding or kneading the aminobenzene and the arylamide of 2,3-hydroxynaphthoic acid with the condensation product of the aromatic hydroxy compound and the aromatic ω-methane-sulfonic acid in the presence of water.

For use in the dyeing of textile material of aromatic polyesters or triacetyl cellulose the dyeing preparations are diluted with water and introduced into a dyebath of 85–90° C. which contains, if desired, a carrier. Subsequently, dyeing is carried out in known manner by impregnating at 95–100° C., by diazotizing and after-treating.

The following examples serve to illustrate the invention but they are not intended to limit it thereto. The water-soluble condensation product used in the preparation according to the following examples has been obtained by reaction of 0.7 to 1.3 mols of formaldehyde with 1 mol of the specified aromatic hydroxy compound or mixture thereof and 0.3 to 0.7 mole of sodium sulfite, and further condensed with 0.1 mol of the specified sulfomethyl-hydroxynaphthalene-sulfonic acid or sodium salt thereof in an analogous manner as described in Fiat Final Report No. 1013.

EXAMPLE 1

60 g. of 1-amino-4-benzenesulfonylaminobenzene, 60 g. of 1-(2',3'-hydroxynaphthoylamino)-2-ethoxybenzene, 30 g. of the condensation product of formaldehyde, a mixture of equal parts of m- and p-cresol, sodium sulfite as well as the sodium salt of 1-ω-sulfomethyl-2-hydroxynaphthalene-6-sulfonic acid, 0.5 g. of sodium pentachlorophenolate, 0.5 g. of a mixture of triisobutyl phosphate and isobutanol and 199 g. of water are thoroughly mixed and then rolled in a drum mill made of porcelain (content: 0.9 liter) with 600 g. of porcelain balls (diameter 5–20 mm.) for 100 hours on a chair roller. A viscous dispersion is obtained, containing 34.3% of the dyestuff components and yielding on polyester fibers claret dyeings.

EXAMPLE 2

150 g. of 1-amino-2-methoxybenzene-5-sulfonic acid diethylamide, 150 g. of 1-(2',3'-hydroxynaphthoylamino)-2-methoxybenzene, 75 g. of the condensation product of formaldehyde, a mixture of equal parts of m- and p-cresol, sodium sulfite as well as the sodium salt of 1-ω-sulfomethyl-2-hydroxynaphthalene-6-sulfonic acid, 1 g. of sodium pentachlorophenolate, 1 g. of a mixture of triisobutyl phosphate and isobutanol and 325 g. of water are thoroughly mixed while stirring and then rolled in an iron ball mill laid out with rubber with 1,700 g. of steatite balls (diameter 18 mm.) for about 100 hours on a chair roller. A viscous dispersion is obtained, containing 42.7% of the dyestuff components and yielding on polyester fibres red dyeings.

EXAMPLE 3

40 g. of 1-amino-2-nitro-4-chlorobenzene, 80 g. of 2,3-hydroxy-naphthoylaminobenzene, 30 g. of the condensation product of formaldehyde, a mixture of m- and p-cresol (ratio: 56:44), sodium sulfite as well as the sodium salt of 2-(or 4-)-ω-sulfomethyl-1-hydroxynaphthalene-5-sulfonic acid, 0.5 g. of sodium pentachlorophenolate, 1 g. of a mixture of triisobutyl phosphate and isopropanol and 200 g. of water are mixed in a high-speed toothed disc device and then finely dispersed by grinding for 30 minutes in a discontinuously agitating ball mill (content of mill pot: 1 liter), which has been fed with 1 kg. of siliquartzite beads (diameter 0.5–3.0 mm.). The dispersion contains 34.3% of the dyestuff components and yields on polyester fibers red dyeings.

EXAMPLE 4

12 kg. of 1-amino-3-nitrobenzene, 12 kg. of 1-(2',3'-hydroxynaphthoylamino)-2-methoxybenzene, 5.2 kg. of the condensation product of formaldehyde, a mixture of equal parts of m- and p-cresol, sodium sulfite as well as the sodium salt of 1-ω-sulfomethyl-2-hydroxynaphthalene-6-sulfonic acid, 1.2 kg. of the sodium salt of dibutylnaphthalene-sulfonic acid, 0.12 kg. of sodium pentachlorophenolate, 0.24 kg. of a mixture of triisobutyl phosphate and isobutanol, 9.6 kg. of ethylene glycol and 19.64 kg. of water are thoroughly mixed and then in a discontinuous way, given over an agitating ball mill having a content of 5 liters. The product which had run-off is led back into the mixing vessel. After grinding for about 20 hours the required fine dispersion is obtained. The viscous dough contains 40% of the dyestuff components and yields on polyester fibers orange-red dyeings.

In an analogous manner dyeing preparations of the following composition may be obtained:

(a) 28.1 parts by weight of 1-(2',3'-hydroxynaphthoylamino-2-methoxybenzene, 11.9 parts by weight of 1)-amino-2-methoxy-4-nitrobenzene, 8.3 parts by weight of the condensation product of formaldehyde, a mixture of about equal parts of m- and p-cresol, sodium sulfite as well as the sodium salt of 1-sulfomethyl-2-hydroxynaphthalene-6-sulfonic acid, 0.2 part by weight of a mixture of triisobutyl phosphate and isobutanol, 0.2 part by weight of sodium pentachlorophenolate, 17.3 parts by weight of ethylene glycol, 34 parts by weight of water;

(b) 28.1 parts by weight of 1-(2',3'-hydroxynaphthoylamino)-2-methoxybenzene, 11.9 parts by weight of 1-amino-2-methoxy-4-nitrobenzene, 8.3 parts by weight of the condensation product of formaldehyde, a mixture of about equal parts of m- and p-cresol, sodium sulfite as well as the sodium salt of 1-sulfomethyl-2-hydroxynaphthalene-6-sulfonic acid, 0.2 part by weight of a mixture of triisobutyl phosphate and isobutanol, 0.2 part by weight of sodium pentachlorophenolate, 20 parts by weight of glycerol, and 31.3 parts by weight of water;

(c) 28.1 parts by weight of 1-(2',3'-hydroxynaphthoylamino)-2-methoxybenzene, 11.9 parts by weight of 1-amino-2-methoxy-5-nitrobenzene, 9.3 parts by weight of the condensation product of formaldehyde, a mixture of about equal parts of m- and p-cresol, sodium sulfite as well as the sodium salt of 1-sulfomethyl-2-hydroxynaphthalene-6-sulfonic acid, 0.2 part by weight of a mixture of triisobutyl phosphate and isobutanol, 0.2 part by weight of sodium pentachlorophenolate, 50.3 parts by weight of water;

(d) 28.1 parts by weight of 1-(2',3'-hydroxynaphthoylamino)-2-methoxybenzene, 11 parts by weight of 1-amino-2-methyl-5-nitrobenzene, 10 parts by weight of the condensation product of formaldehyde, a mixture of about equal parts of m- and p-cresol, sodium sulfite as well as the sodium salt of 1-sulfomethyl-2-hydroxynaphthalene-6-sulfonic acid, 0.2 part by weight of a mixture of triisobutyl phosphate and isobutanol, 0.2 part by weight of sodium pentachlorophenolate, 50.5 parts by weight of water;

(e) 18.3 parts by weight of 1-(2',3'-hydroxynapthoylamino)-2-methoxy-5-chlorobenzene, 16.7 parts by weight of 1-amino-2-methoxybenzene-5-sulfonic acid n-butylamide, 9 parts by weight of the condensation product of formaldehyde, a mixture of about equal parts of m- and p-cresol, sodium sulfite as well as the disodium salt of 1-sulfomethyl-2-hydroxynapthalene-6,8-disulfonic, acid, 0.2 part by weight of sodium pentachlorophenolate, 0.5 part by weight of a mixture of triisobutyl phosphate and isobutanol, 55.3 parts by weight of water;

(f) 20 parts by weight of 1-(2',3'-hydroxynaphthoylamino)-2,5-diamethoxybenzene, 15 parts by weight of 1-amino-2-methylbenzene-5-sulfonic acid dimethylamide, 12.0 parts by weight of the condensation product of formaldehyde, m-cresol, sodium sulfite as well as the sodium salt of 2-sulfomethyl-1-hydroxynaphthalene-8-sulfonic acid, 0.2 part my weight of a mixture of triisobutyle phosphate and isobutanol, 52.8 parts by weight of water;

(g) 17.5 parts by weight of 1-(2',3'-hydroxynaphthoylamino)-4-methylbenzene, 17.5 parts by weight of 1-amino-2-methoxybenzene-5-ethylsulfone, 12 parts by weight of the condensation product of formaldehyde, 3-methoxyphenol, sodium sulfite as well as the sodium salt of 1 - sulfomethyl-2-hydroxynaphthalene-6-sulfonic acid, 0.2 parts by weight of a mixture of triisobutyl phosphate and isobutanol, 0.2 part by weight of sodium pentachlorophenolate, 52.6 parts by weight of water;

(h) 17.5 parts by weight of 1-(2',3'-hydroxynaphthoylamino)-2-methylbenzene, 17.5 parts by weight of 1-amino-2-methoxybenzene-5-benzylsulfone, 9 parts by weight of the condensation product of formaldehyde, a mixture of equal parts of 4-hydroxy-1,2-dimethylbenzene and 5-hydroxy-1,3-dimethylbenzene, sodium sulfite as well as the sodium salt of 1-sulfomethyl-2-hydroxynaphthalene-6-sulfonic acid, 0.2 part by weight of a mixture of triisobutyl phosphate and isobutanol, 0.2 part by weight of sodium pentachlorophenolate, 55.6 parts by weight of water;

(i) 26.7 parts by weight of 1-(2',3'-hydroxynaphthoylamino)-2-methoxybenzene, 13.3 parts by weight of 1-amino-2-nitro-4-methylbenzene, 6.7 parts by weight of the condensation product of formaldehyde, a mixture of about equal parts of m- and p-cresol, sodium sulfite as well as the sodium salt of 1-sulfomethyl-2-hydroxynaphthalene-6-sulfonic acid, 0.2 part by weight of sodium pentachlorophenolate, 20 parts by weight of glycerol, 33.1 parts by weight of water;

(k) 16 parts by weight of 1-(2',3'-hydroxynaphtholyl-amino)-2-methoxybenzene, 14 parts by weight of 2-amino-diphenylsulfone, 8 parts by weight of the condensation product of formaldehyde, a mixture of about equal parts of m- and p-cresol, sodium sulfite as well as the sodium salt of 1 - sulfomethyl - 2-hydroxynaphthalene-6-sulfonic acid, 0.2 part by weight of sodium pentachlorophenolate, 0.5 part by weight of a mixture of triisobutyl phosphate and isobutanol, 61.3 parts by weight of water;

(l) 15 parts by weight of 1-(2',3'-hydroxynaphthoyl-amino)-4-methoxybenzene, 18.3 parts by weight of 1-amino-2-methoxybenzene-5-carboxylic acid amide, 9 parts by weight of the condensation product of formaldehyde, a mixture of equal parts of 4-hydroxy-1,2-dimethylbenzene and 5-hydroxy-1,3-dimethylbenzene, sodium sulfite as well as the sodium salt of 1-sulfomethyl-2-hydroxynaphthalene-6-sulfonic acid, 0.2 part by weight of sodium pentachlorophenolate, 0.2 part by weight of a mixture of triisobutyl phosphate and isobutanol, 57.3 parts by weight of water;

(m) 16.7 parts by weight of 1-(2',3'-hydroxynaphthoyl-amino)-2-methylbenzene, 16.7 parts by weight of 1-amino-2-methyl-4-benzoylamino - 5 - chlorobenzene, 11 parts by weight of the condensation product of formaldehyde, m-cresol, sodium sulfite as well as the sodium salt of 2-sulfomethyl-1-hydroxy-naphthalene-8-sulfonic acid, 0.2 part by weight of sodium pentachlorophenolate, 0.2 part by weight of a mixture of triisobutyl phosphate and iso-butanol, 16.7 parts by weight of ethylene glycol, 38.5 parts by weight of water;

(n) 16.7 parts by weight of 2,3-hydroxynapthoylamino-benzene, 16.7 parts by weight of 1-amino-2,4-dimethyl-5-benzoylaminobenzene, 6.7 parts by weight of the condensation product of formaldehyde, a mixture of equal parts of 4-hydroxy-1,2-dimethylbenzene and 5-hydroxy-1,3-dimethylbenzene, sodium sulfite as well as the sodium salt of 1 - sulfomethyl - 2-hydroxynaphthalene-6-sulfonic acid, 0.2 part by weight of sodium pentachlorophenolate, 0.2 part by weight of a mixture of triisobutyl phosphate and isobutanol, 59.5 parts by weight of water;

(o) 28.1 parts by weight of 1-(2',3'-hydroxynapthoyl-amino)-2-methoxybenzene, 11.9 parts by weight of 1-amino-2-methoxy-4-nitrobenzene, 6.7 parts by weight of the condensation product of formaldehyde, a mixture of equal parts of 4-hydroxy-1,2-dimethylbenzene and 5-hydroxy-1,3-dimethylbenzene, sodium sulfite as well as the sodium salt of 1-sulfomethyl-2-hydroxynaphthalene-6-sulfonic acid, 0.2 part by weight of sodium pentachloro-phenolate, 0.2 part by weight of a mixture of triisobutyl phosphate and isobutanol, 16.7 parts by weight of ethylene glycol, 36.2 parts by weight of water.

We claim:
1. A dyeing preparation for the manufacture of a water-insoluble azo dyestuff on textile materials containing an aromatic polyester or cellulose triacetate, said preparation comprising:
(a) about 10 to 30 percent by weight of an arylamide of 2,3-hydroxynaphthoic acid which is free from sulfonic acid and carboxylic acid groups,
(b) about 10 to 30 percent by weight of an amino-benzene of the formula:

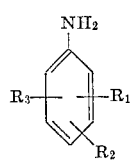

in which $R_1$ represents nitro, lower alkylsulfonyl, benzylsulfonyl, phenylsulfonyl, lower alkylsulfonyl-amino, phenylsulfonylamino, carboxylic acid amide, carboxylic acid-di-(lower alkyl)-amide, sulfonic acid amide, sulfonic acid-lower alkyl amide, sulfonic acid-di(lower alkyl)-amide or benzoylamino, $R_2$ represents hydrogen, methoxy or methyl and $R_3$ represents hydrogen, chlorine or methyl, said components (a) and (b) being present in about equimolar proportions,
(c) about 6 to 20 percent by weight of a water-soluble condensation product, obtained by the reaction of:
(1) formaldehyde with
(2) cresol, xylenol, resorcinol-monoalkyl ether or mixtures thereof and
(3) sodium sulfite, and further condensed with
(4) an ω-sulfomethyl-hydroxynaphthalene-sulfonic acid or the sodium salt thereof, and
(d) water in an amount to form with the other constituents a paste or dough.

2. The dyeing preparation according to claim 1 wherein $R_1$ is nitro, ethylsulfone, benzylsulfone, phenylsulfone, phenylsulphonyl-amino, carboxylic acid amide, sulfonic acid butyl amide, sulfonic acid dimethyl amide, sulfonic acid diethyl amide or benzoylamino.

3. A dyeing preparation as claimed in claim 1, comprising (a) 20.0 percent by weight of 1-(2',3'-hydroxy-naphthoylamino)-2-methoxybenzene, (b) 20.0 percent by weight of 1-amino-3-nitrobenzene, (c) 8.7 percent by weight of the condensation product obtained by reaction of 0.7 to 1.3 mols of formaldehyde with 1 mol of a mixture (1:1) of m- and p-cresol and 0.3 to 0.7 mol of sodium sulfite, and further condensed with 0.1 mol of the sodium salt of 1 - sulfomethyl - 2 - hydroxynaphthalene-6-sulfonic acid, (d) 32.7 percent by weight of water, and further 2.0 percent by weight of the sodium salt of dibutylnaphthal-enesulfonic acid, 0.2 percent by weight of sodium pentachlorophenolate, 0.4 percent by weight of a mixture (60:40) of triisobutyl phosphate and isobutyl alcohol and 16.0 percent by weight of ethylene glycol.

4. A dyeing preparation as claimed in claim 1, comprising: (a) 28.1 percent by weight of 1-(2',3'-hydroxy-naphthoylamino)-2-methoxybenzene, (b) 11.9 percent by weight of 1-amino-2-methoxy-4-nitrobenzene, (c) 8.3 percent by weight of the condensation product obtained by reaction of 0.7 to 1.3 mols of formaldehyde with 1 mol of a mixture (1:1) of m- and p-cresol and 0.3 to 0.7 mol of sodium sulfite, and further condensed with 0.1 mol of the sodium salt of 1 - sulfomethyl - 2-hydroxynaphthalene-6-sulfonic acid, (d) 34.0 percent by weight of water, and further 0.2 percent by weight of a mixture (60:40) of tri-isobtuyl phosphate and isobutyl alcohol, 0.2 percent by weight of sodium pentachlorophenolate and 17.3 percent by weight of ethylene glycol.

5. A dyeing preparation as claimed in claim 1, comprising: (a) 28.1 percent by weight of 1-(2',3'-hydroxy-naphthoylamino)-2-methoxybenzene, (b) 11.9 percent by weight of 1-amino-2-methoxy-5-nitrobenzene, (c) 9.3 percent by weight of the condensation product obtained by reaction of 0.7 to 1.3 mols of formaldehyde with 1 mol of a mixture (1:1) of m- and p-cresol and 0.3 to 0.7 mol of sodium sulfite, and further condensed with 0.1 mol of the sodium salt of 1-sulfomethyl-2-hydroxynaphthalene-6-sulfonic acid, (d) 50.3 percent by weight of water, and further 0.2 percent by weight of a mixture (60:40) of triisobutyl phosphate and isobutyl alcohol and 0.2 percent by weight of sodium pentachlorophenolate.

6. A dyeing preparation as claimed in claim 1, comprising: (a) 16.0 percent by weight of 1-(2',3'-hydroxy-naphthoylamino)-2-methoxybenzene, (b) 14.0 percent by weight of 2-amino-diphenylsulfone, (c) 8.0 percent by weight of the condensation product obtained by reaction of 0.7 to 1.3 mols of formaldehyde, 1 mol of a mixture (1:1) of m- and p-cresol and 0.3 to 0.7 mol of sodium sulfite, and further condensed with 0.1 mol of the sodium salt of 1-sulfomethyl-2-hydroxynaphthalene-6-sulfonic acid, (d) 61.3 percent by weight of water, and further 0.2 percent by weight of sodium pentachlorophenolate and 0.5 percent by weight of a mixture (60:40) of triisobutyl phosphate and isobutyl alcohol.

References Cited

UNITED STATES PATENTS

| | | | |
|---|---|---|---|
| 1,532,427 | 4/1925 | Metzger | 8—171 |
| 1,870,498 | 8/1932 | Ellner | 8—46 |
| 2,115,136 | 4/1938 | Blackshaw et al. | 8—46 |
| 2,999,731 | 9/1961 | Harding | 8—54 |

FOREIGN PATENTS

| | | | |
|---|---|---|---|
| 246,181 | 6/1927 | Great Britain | 8—14 |
| 426,424 | 6/1926 | Germany. | |
| 724,755 | 9/1942 | Germany. | |

GEORGE F. LESMER, Primary Examiner

P. C. IVES, Assistant Examiner

U.S. Cl. X.R.

8—46, 90, 171